Figure 1:
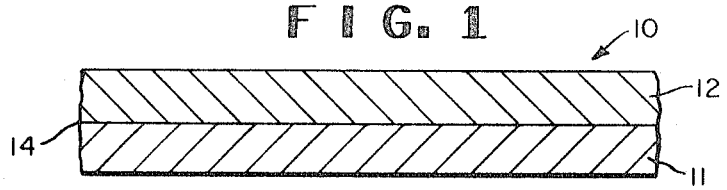
Figure 2:
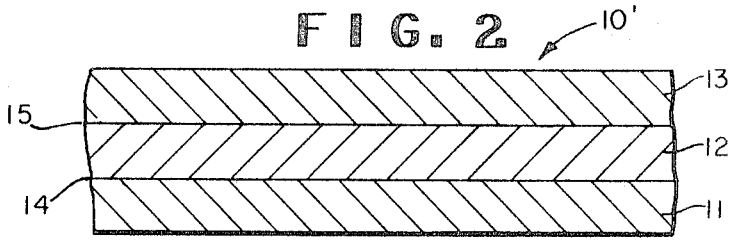
Figure 3:
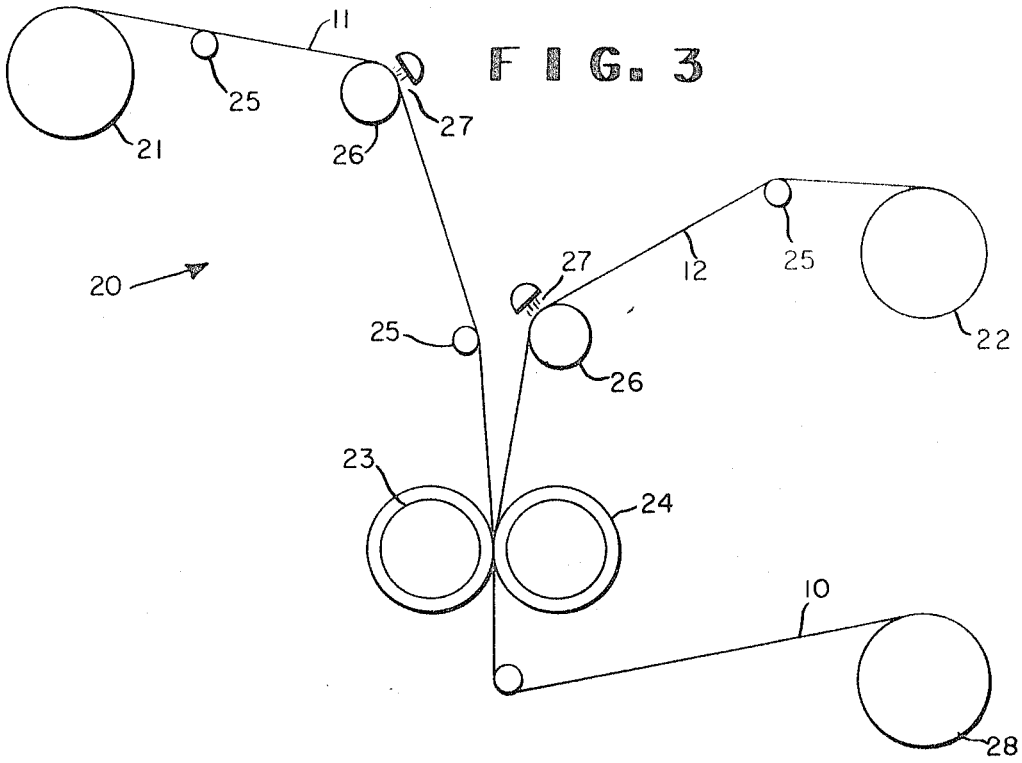

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 704

T888,001
COMPOSITE FILM STRUCTURE AND METHOD OF MAKING IT

George Marshall Drake, Jr., Richmond, Va., assignor to E. I. du Pont de Nemours and Company, Wilmington, Del.

Filed Mar. 6, 1970, Ser. No. 17,243
Int. Cl. C09j *5/02*
U.S. Cl. 156—306
1 Sheet Drawing. 13 Pages Specification

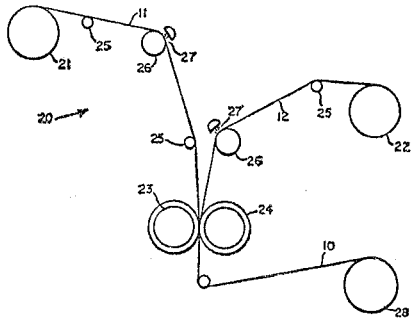

A method of laminating two or more uncoated thermoplastic films, each selected from the group consisting of polyethylene, polypropylene, an ionic hydrocarbon polymer, polyethylene terephthalate and nylon, comprising: treating at least one of the film surfaces by flame, electrical discharge or chlorination to promote adhesion; compacting the treated surface together under moderate pressure (at least 25 pounds per square inch) and moderate heat (60° C.–90° C.) to form a composite film structure; and winding the composite film structure onto a core while under tension.

This composite film structure formed by this method has a bond strength of at least 25 grams per inch.

July 20, 1971 G. M. DRAKE, JR T888,001

COMPOSITE FILM STRUCTURE AND METHOD OF MAKING IT

Filed March 6, 1970

INVENTOR

GEORGE M. DRAKE, JR.

BY George C. Sweetland

ATTORNEY